(12) United States Patent
Chen et al.

(10) Patent No.: US 12,457,001 B2
(45) Date of Patent: Oct. 28, 2025

(54) PROTECTIVE CASE FOR HANDHELD ELECTRONIC DEVICE

(71) Applicant: ASUSTEK COMPUTER INC., Taipei (TW)

(72) Inventors: Wei-En Chen, Taipei (TW); Kuo Wei Lien, Taipei (TW); Yuan-Kai Yeh, Taipei (TW); Yu-Sheng Lin, Taipei (TW); Pei-Chiang Lin, Taipei (TW); Wei-Hsiang Chiu, Taipei (TW); Guan-Wei Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 571 days.

(21) Appl. No.: 17/894,892

(22) Filed: Aug. 24, 2022

(65) Prior Publication Data
US 2023/0223977 A1 Jul. 13, 2023

(30) Foreign Application Priority Data
Jan. 12, 2022 (TW) .................................. 111101351

(51) Int. Cl.
*H04B 1/3888* (2015.01)
(52) U.S. Cl.
CPC ................... *H04B 1/3888* (2013.01)
(58) Field of Classification Search
CPC ..................................................... H04B 1/3888

USPC .......................... 455/90.3, 557, 575.6, 575.8
See application file for complete search history.

(56) References Cited

U.S. PATENT DOCUMENTS

| 2017/0331508 A1* | 11/2017 | Kim ....................... H04M 1/185 |
| 2018/0069585 A1* | 3/2018 | Azodi ................. H04M 1/0202 |
| 2019/0052298 A1* | 2/2019 | Lee ......................... B62J 50/225 |

FOREIGN PATENT DOCUMENTS

| CN | 103429031 B | 8/2016 |
| CN | 213186207 U | 5/2021 |
| TW | I503667 B | 10/2015 |

* cited by examiner

*Primary Examiner* — Michael Y Mapa
(74) *Attorney, Agent, or Firm* — Muncy, Geissler, Olds & Lowe, P.C.

(57) ABSTRACT

A protective case applied to assemble to a handheld electronic device is provided. The protective case includes an inner surface, an outer surface, a connector, a plurality of first detachable connecting structures, and a plurality of first electrical connecting structures. The connector is located at the inner surface to electrically connect to the handheld electronic device. The connector includes a plurality of signal transmitting pins. The first detachable connecting structures are arranged in a first array on the outer surface. The first electrical connecting structures are arranged in a second array on the outer surface. The first electrical connecting structures are electrically connected to the signal transmitting pins respectively.

9 Claims, 19 Drawing Sheets

PROTECTIVE CASE FOR HANDHELD ELECTRONIC DEVICE

CROSS-REFERENCE TO RELATED APPLICATION

This application claims the priority benefit of Taiwan application serial No. 111101351, filed on Jan. 12, 2022. The entirety of the above-mentioned patent application is hereby incorporated by reference herein and made a part of the specification.

BACKGROUND OF THE INVENTION

Field of the Invention

The disclosure relates to a protective case, and in particular, to a protective case for a handheld electronic device.

Description of the Related Art

Smartphones are indispensable mobile devices for modern people and are widely applied to daily life and work. Limited by the inner space and manufacturing cost of the smartphones, it is impossible to add functional modules to the smartphones arbitrarily, which makes it difficult to meet various use needs that consumers expect.

BRIEF SUMMARY OF THE INVENTION

The disclosure provides a protective case applied to assemble to a handheld electronic device. The protective case includes an inner surface, an outer surface, a connector, a plurality of first detachable connecting structures, and a plurality of first electrical connecting structures. The connector is located at the inner surface to electrically connect to the handheld electronic device. The connector includes a plurality of signal transmitting pins. The first detachable connecting structures are arranged in a first array on the outer surface. The first electrical connecting structures are arranged in a second array on the outer surface. The first electrical connecting structures are electrically connected to the signal transmitting pins respectively.

With the protective case provided in the disclosure, a user installs one or more expansion modules into the handheld electronic device according to needs. In this way, the user installs the required expansion module according to needs, so as to improve the flexibility in use. When the expansion function is not needed, the expansion module is removed to ensure the portability of the handheld electronic device.

DETAILED DESCRIPTION OF THE EMBODIMENTS

The following further describes the specific implementations of the disclosure in detail with reference to the schematic diagrams. The advantages and features of the disclosure become more comprehensible according to the following description and claims. The drawings are in a very simplified form and are in a non-precise scale, which are only used to facilitate and clearly assist in explaining the purpose of the embodiments of the disclosure.

Figure 1:
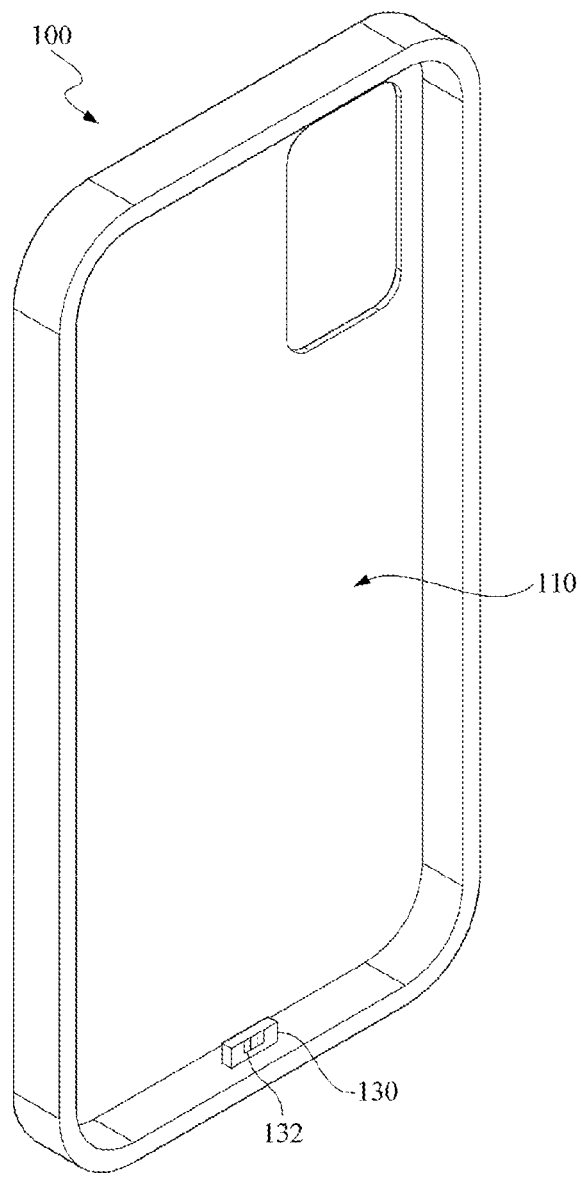
FIG. 1 is a schematic three-dimensional front view of an embodiment of a protective case according to the disclosure.
Figure 2:
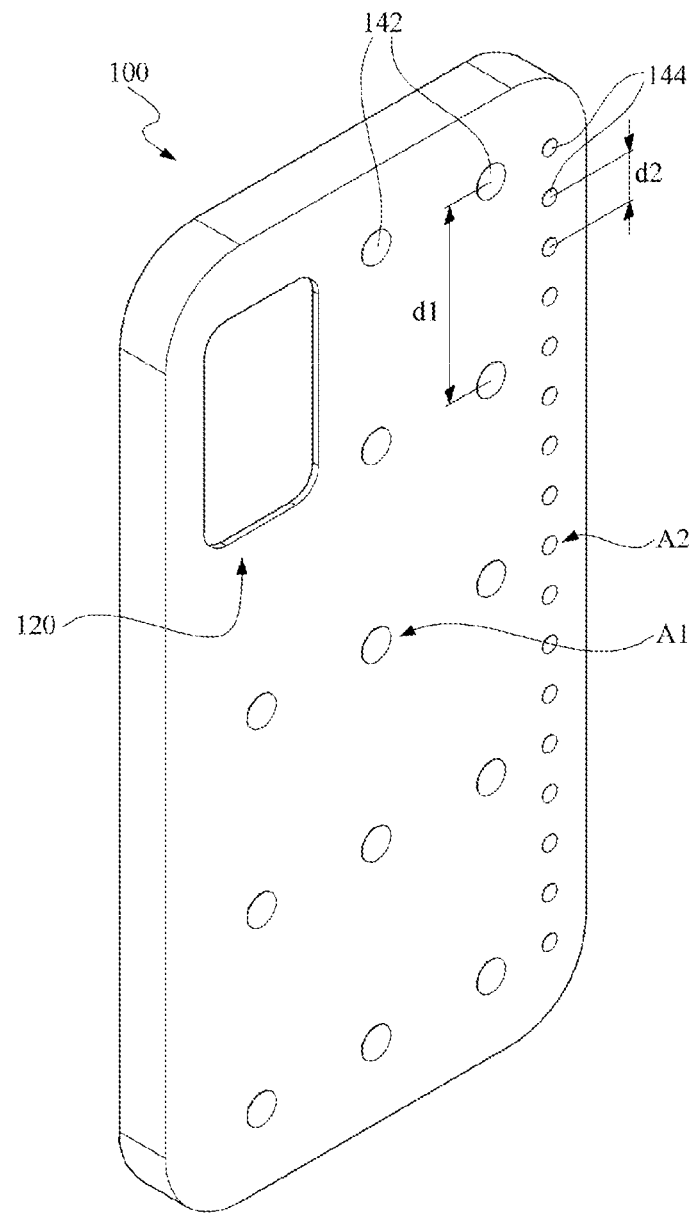
FIG. 2 is a schematic three-dimensional rear view of an embodiment of a protective case according to the disclosure.

FIG. 1 is a schematic three-dimensional front view of an embodiment of a protective case according to the disclosure; FIG. 2 is a schematic three-dimensional rear view of an embodiment of a protective case according to the disclosure. The protective case is applied to assemble to a handheld electronic device such as a mobile phone or a tablet.

The protective case 100 includes an inner surface 110, an outer surface 120, a connector 130, a plurality of first detachable connecting structures 142, and a plurality of first electrical connecting structures 144.

The inner surface 110 is a surface of the protective case 100 facing one side of the handheld electronic device. The outer surface 120 is located at an opposite side of the inner surface 110 and is a surface of the protective case 100 facing outward. The connector 130 is disposed at the inner surface 110 to electrically connect to the handheld electronic device. The connector 130 includes a plurality of signal transmitting pins 132. In an embodiment, the connector 130 is a universal serial bus (USB) connector, such as a Type-C USB connector.

The first detachable connecting structures 142 and the first electrical connecting structures 144 are both disposed on the outer surface 120 for connecting expansion modules 210, 220, 230, 240, and 250 (see FIG. 3 to FIG. 7). The first detachable connecting structures 142 are arranged in a first array A1 on the outer surface 120. The first detachable connecting structures 142 include a fixed spacing distance d1.

The first electrical connecting structures 144 are arranged in a second array A2 on the outer surface 120. The first electrical connecting structures 144 include a fixed spacing distance d2. The first electrical connecting structures 144 are electrically connected to the signal transmitting pins 132 of the connector respectively.

In an embodiment, the number of the first electrical connecting structures 144 corresponds to the number of signal transmitting pins 132 of the connector 130. When the first detachable connecting structures 142 fixes the expansion modules 210, 220, 230, 240, and 250 to the outer surface 120 of the protective case 100, the first electrical connecting structures 144 are electrically connected to the expansion modules 210, 220, 230, 240, and 250.

In an embodiment, the arrangement manner of the first array A1 is different from that of the second array A2. In an embodiment, the first array A1 is a planar array and the second array A2 is a linear array. In other embodiments, both the first array A1 and the second array A2 are planar arrays.

In an embodiment, the first detachable connecting structures 142 is a buckle structure. In other embodiments, the first detachable connecting structures 142 is also a magnetic part. In an embodiment, the first electrical connecting structures 144 is an elastic pin structure, such as a pogo pin structure.

Figure 3:
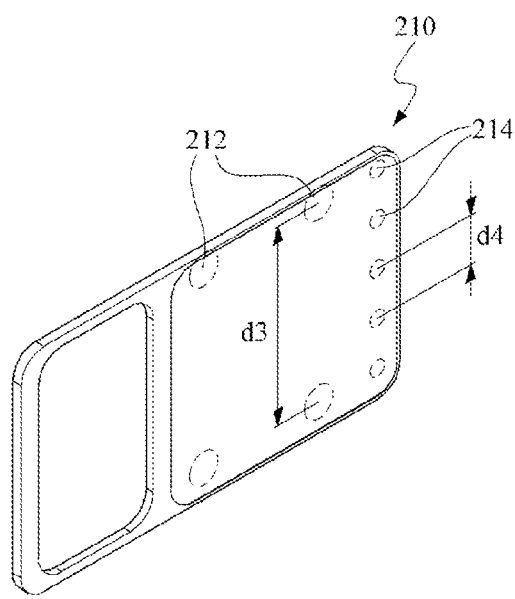
FIG. 3 is a schematic diagram of a first embodiment of an expansion module according to the disclosure.

FIG. 3 is a schematic diagram of a first embodiment of an expansion module according to the disclosure. The expansion module 210 in this embodiment is an expansion sub-screen.

The expansion module 210 includes a plurality of second detachable connecting structures 212 and a plurality of second electrical connecting structures 214. The positions of the second detachable connecting structures 212 and the second electrical connecting structures 214 respectively correspond to the first detachable connecting structures 142 and the first electrical connecting structures 144 located on the outer surface 120 of the protective case 100.

The structures of the second detachable connecting structures 212 and the second electrical connecting structures 214 respectively correspond to the first detachable connecting structures 142 and the first electrical connecting structures 144 located on the outer surface 120 of the protective case 100, so as to ensure that the expansion module 210 is firmly fixed to the outer surface 120 and that the handheld electronic device is electrically connected to the expansion module 210 through the connector 130 disposed on the inner surface 110 of the protective case 100.

In an embodiment, a spacing distance d3 between two adjacent second detachable connecting structures 212 is the same as the spacing distance d1 between two adjacent first detachable connecting structures 142. In other embodiments, the spacing distance d3 between two adjacent second detachable connecting structures 212 is an integer multiple of the spacing distance d1 between two adjacent first detachable connecting structures 142.

In an embodiment, a spacing distance d4 between two adjacent second electrical connecting structures 214 is the same as the spacing distance d2 between two adjacent first electrical connecting structures 144. In other embodiments, the spacing distance d4 between two adjacent second electrical connecting structures 214 is an integer multiple of the spacing distance d2 between two adjacent first electrical connecting structures 144.

In an embodiment, refer to FIG. 2 and FIG. 3 together. The number of the second detachable connecting structures 212 of the expansion module 210 is less than the number of the first detachable connecting structures 142 located on the outer surface 120, and the number of the second electrical connecting structures 214 of the expansion module 210 is less than the number of the first electrical connecting structures 144.

In other words, the expansion module 210 is detachably connected to some of the first detachable connecting structures 142, and detachably disposed on the outer surface 120 of the protective case 100. The expansion module 210 is also detachably connected to some of the first electrical connecting structures 144, to electrically connect to the connector 130, and further electrically connect to the handheld electronic device. The first detachable connecting structures 142 and the first electrical connecting structures 144 on the protective case 100 that are not connected to the expansion module 210 are used to connect to other expansion modules to expand the functions of the handheld electronic device.

Figure 4:
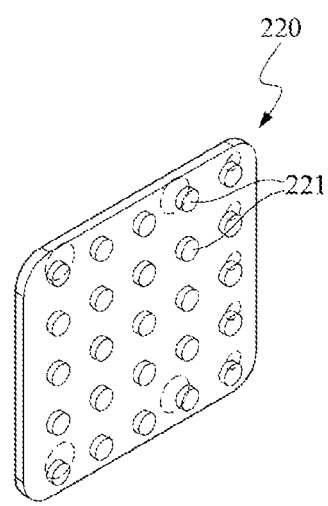
FIG. 4 is a schematic diagram of a second embodiment of an expansion module according to the disclosure.

FIG. 4 is a schematic diagram of a second embodiment of an expansion module according to the disclosure. The expansion module 220 in this embodiment is a light emitting module. The expansion module 220 includes a plurality of light emitting elements 221, such as light emitting diodes. The light emitting elements 221 are arranged in an array on a plane and generate light emitting patterns according to control signals from the handheld electronic device. The manner in which the expansion module 220 is fixed on the protective case 100 and the manner in which the expansion module 220 is electrically connected to the handheld electronic device are similar to those of the expansion module 210 described above, and no repeated description is provided.

Figure 5:
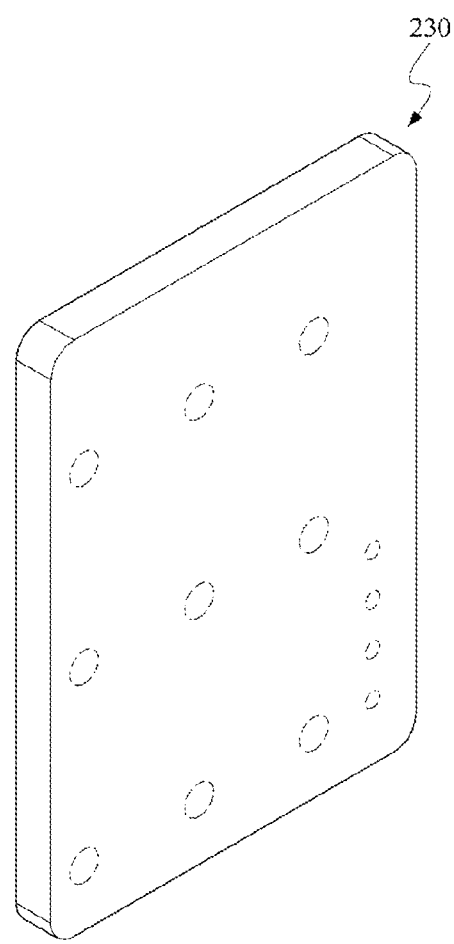
FIG. 5 is a schematic diagram of a third embodiment of an expansion module according to the disclosure.

FIG. 5 is a schematic diagram of a third embodiment of an expansion module according to the disclosure. The expansion module 230 in this embodiment is a battery module. The expansion module 230 charges the handheld electronic device to prolong the service time of the handheld electronic device. The manner in which the expansion module 230 is fixed on the protective case 100 and the manner in which the expansion module 230 is electrically connected to the handheld electronic device are similar to those of the expansion module 210 described above, and no repeated description is provided.

Figure 6:
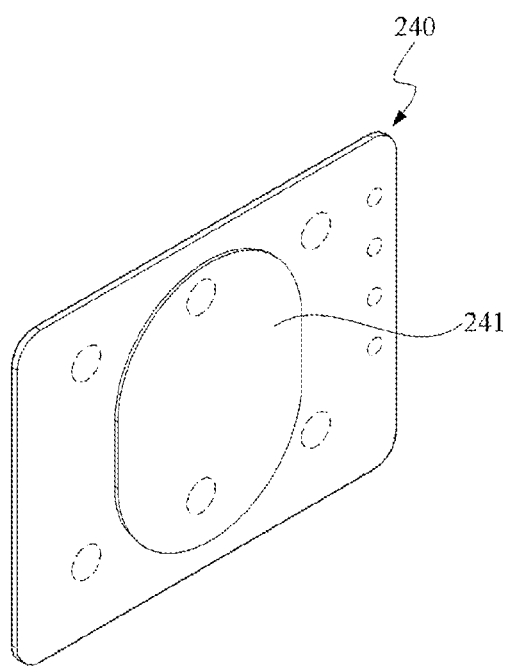
FIG. 6 is a schematic diagram of a fourth embodiment of an expansion module according to the disclosure.

FIG. 6 is a schematic diagram of a fourth embodiment of an expansion module according to the disclosure. The expansion module 240 in this embodiment is a wireless charging module. The expansion module 240 includes a charging coil 241 for receiving electric power in an electromagnetic induction manner and charges the battery in the handheld electronic device in a wired manner through the protective case. The manner in which the expansion module 240 is fixed on the protective case 100 and the manner in which the expansion module 240 is electrically connected to the handheld electronic device are similar to those of the expansion module 210 described above, and no repeated description is provided.

Figure 7:
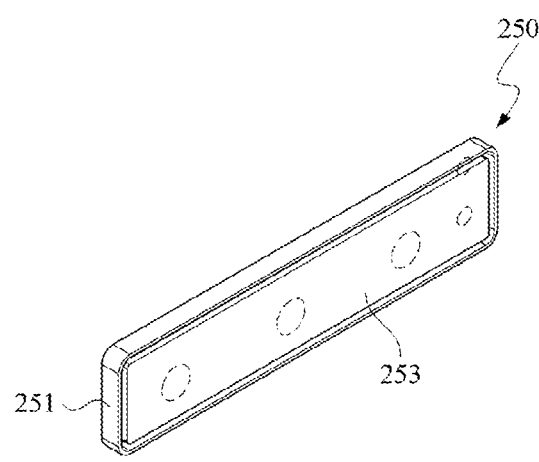
FIG. 7 is a schematic diagram of a fifth embodiment of an expansion module according to the disclosure.

FIG. 7 is a schematic diagram of a fifth embodiment of an expansion module according to the disclosure. The expansion module 250 in this embodiment is a bracket module. The expansion module 250 includes a base 251 and a movable part 253. The movable part 253 is pivotally connected to the base 251 and is movable between a folded position and an unfolded position. When the movable part 253 moves to the unfolded position, the movable part 253 is used as a bracket to support the handheld electronic device at a preset tilt angle. The manner in which the expansion module 250 is fixed on the protective case 100 and the manner in which the expansion module 250 is electrically connected to the handheld electronic device are similar to those of the expansion module 210 described above, and no repeated description is disposed.

Figure 8:
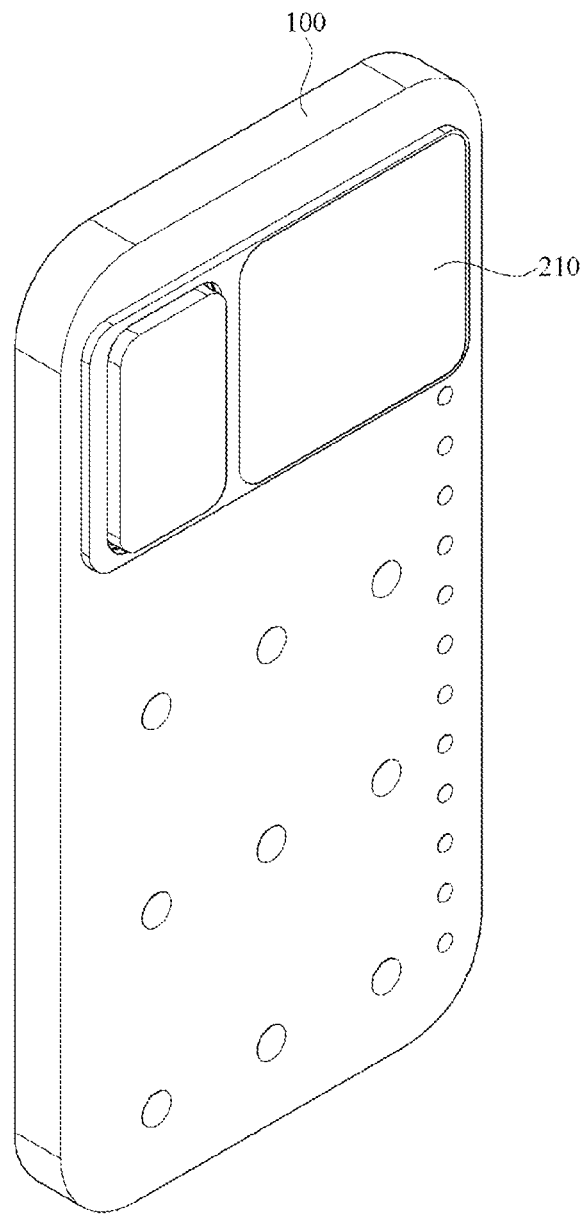
FIG. 8 is a schematic diagram of a handheld electronic device connected to the expansion module in FIG. 3 through a protective case according to the disclosure.
Figure 9:
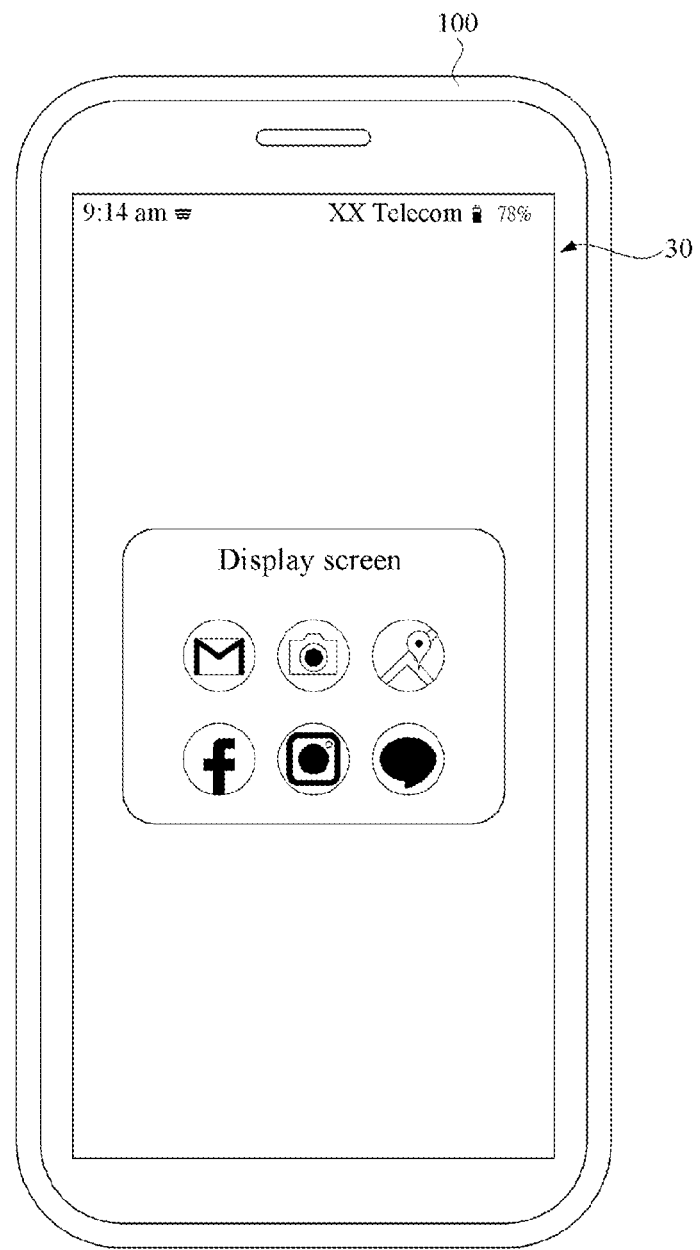
FIG. 9 shows a schematic front view of the handheld electronic device when connected to the expansion module in FIG. 3 according to the disclosure.

FIG. 8 is a schematic diagram of a handheld electronic device 30 connected to the expansion module 210 in FIG. 3 through a protective case 100 according to the disclosure. The figure shows the back of the protective case 100, and the handheld electronic device 30 is located in the inner space of the protective case 100 and is not shown. FIG. 9 shows a schematic front view of the handheld electronic device 30 when connected to the expansion module 210 in FIG. 3 according to the disclosure.

After the expansion module 210 is mounted in the protective case 100, the handheld electronic device 30 confirms a type of the expansion module 210 through the protective case 100, executes a corresponding application program according to the type of the expansion module 210, and displays an execution result on the display screen.

As shown in the figure, since the expansion module 210 is an expansion sub-screen, after executing the application program, the handheld electronic device 30 displays a plurality of icons of the application program suitable for being displayed on the sub-screen on the display screen for the user to select.

Figure 10:
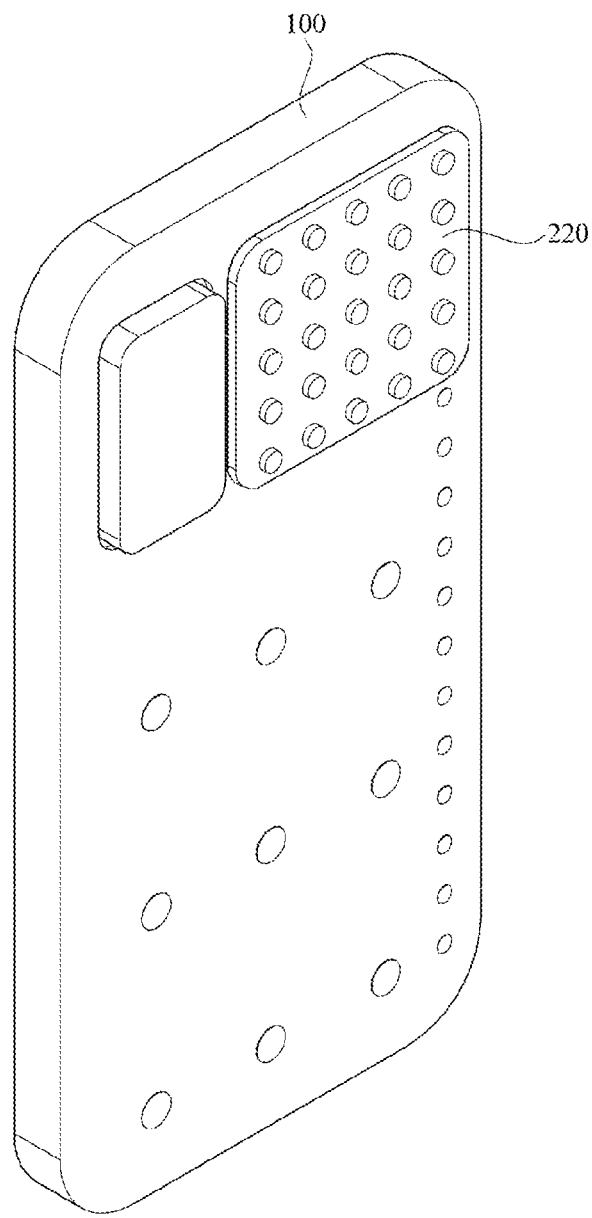
FIG. 10 is a schematic diagram of a handheld electronic device connected to the expansion module in FIG. 4 through a protective case according to the disclosure.
Figure 11:
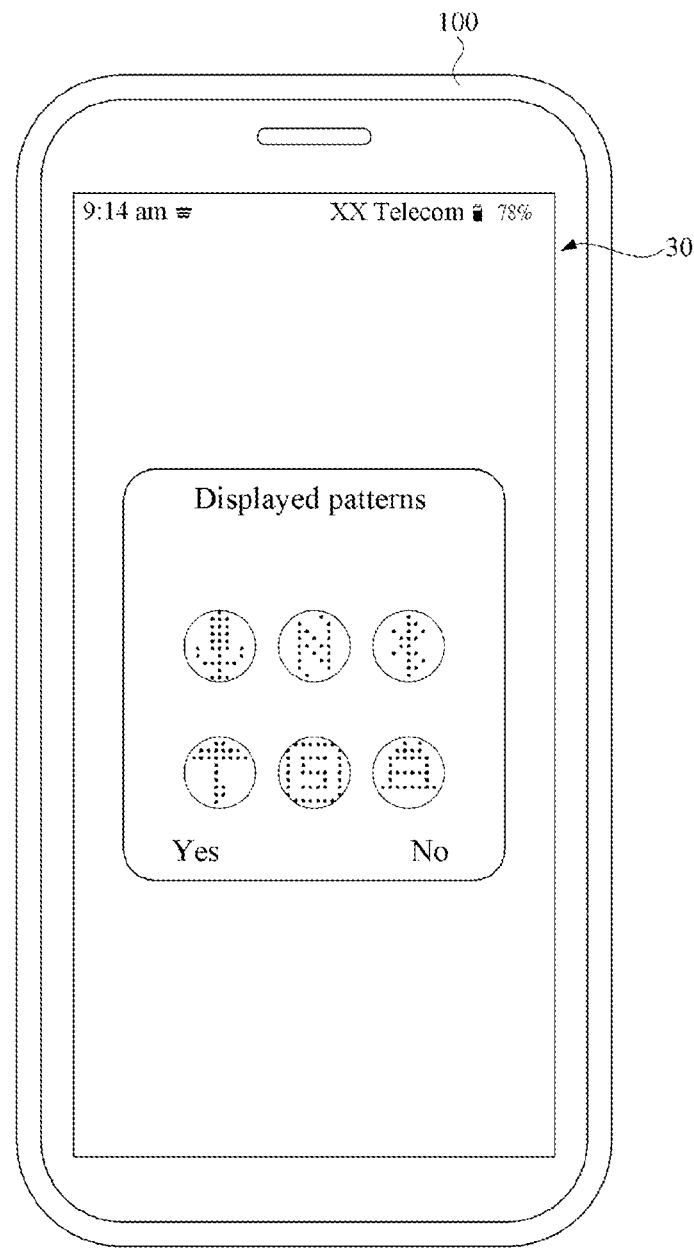
FIG. 11 is a schematic front view of the handheld electronic device when connected to the expansion module in FIG. 4 according to the disclosure.

FIG. 10 is a schematic diagram of a handheld electronic device 30 connected to the expansion module 220 in FIG. 4 through a protective case 100 according to the disclosure. The figure shows the back of the protective case 100, and the handheld electronic device 30 is located in the inner space of the protective case 100 and is not shown. FIG. 11 shows a schematic front view of the handheld electronic device 30 when connected to the expansion module 220 in FIG. 4 according to the disclosure.

As shown in the figure, since the expansion module 220 is a light emitting module, after executing the application program, the handheld electronic device 30 displays a plurality of patterns suitable for being displayed by the light emitting module on the display screen for the user to select.

Figure 12:
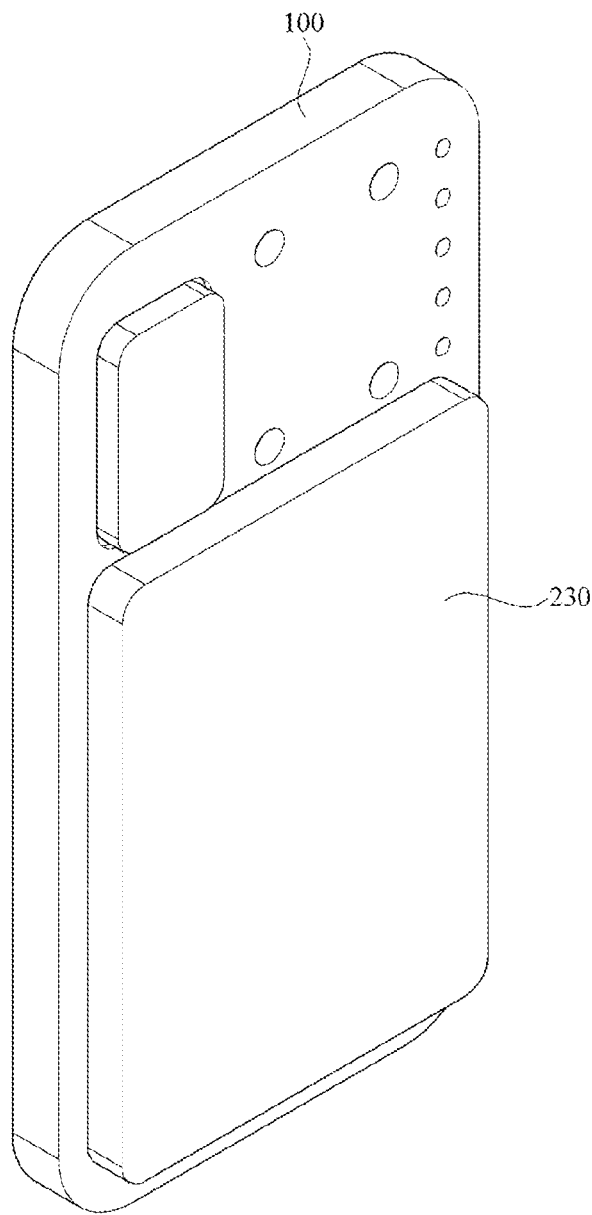
FIG. 12 is a schematic diagram of a handheld electronic device connected to the expansion module in FIG. 5 through a protective case according to the disclosure.
Figure 13:
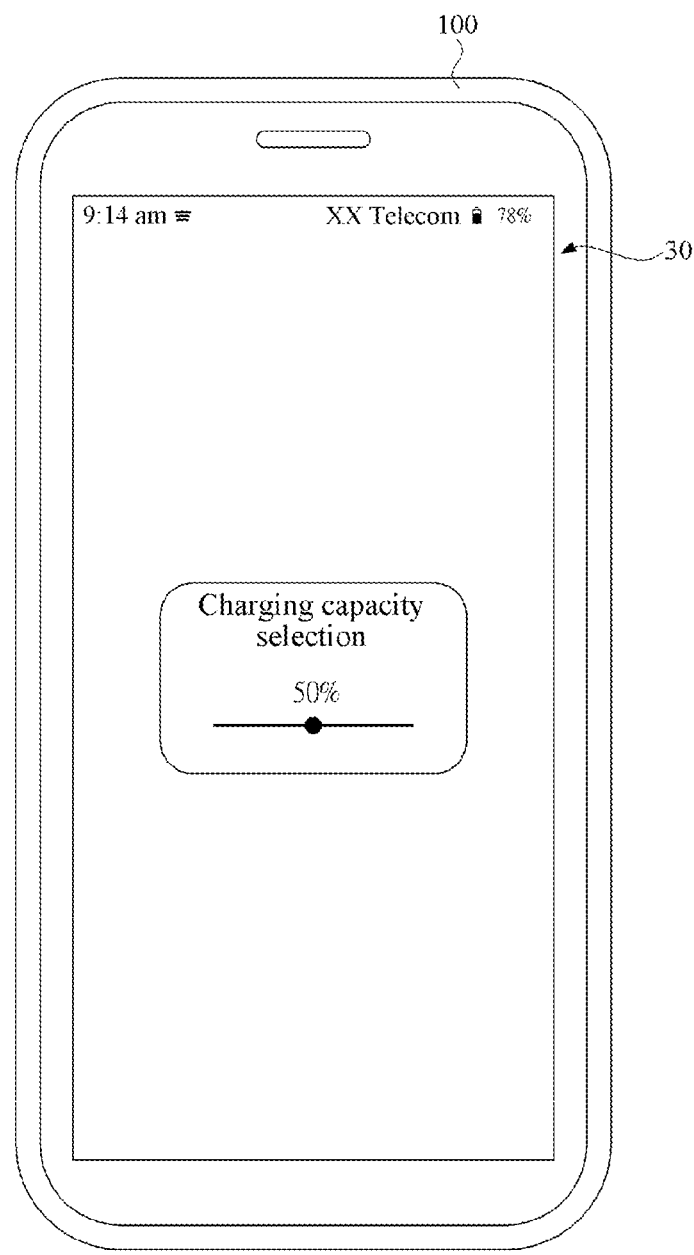
FIG. 13 shows a schematic front view of the handheld electronic device when connected to the expansion module in FIG. 5 according to the disclosure.

FIG. 12 is a schematic diagram of a handheld electronic device 30 connected to the expansion module 230 in FIG. 5 through a protective case 100 according to the disclosure. The figure shows the back of the protective case 100, and the handheld electronic device 30 is located in the inner space of the protective case 100 and is not shown. FIG. 13 shows a schematic front view of the handheld electronic device 30 when connected to the expansion module 230 in FIG. 5 according to the disclosure.

As shown in the figure, since the expansion module 230 is a battery module, after executing the application program, the handheld electronic device 30 displays the battery level of the battery module, and charges the battery of the handheld electronic device 30 by using the battery module.

Figure 14:
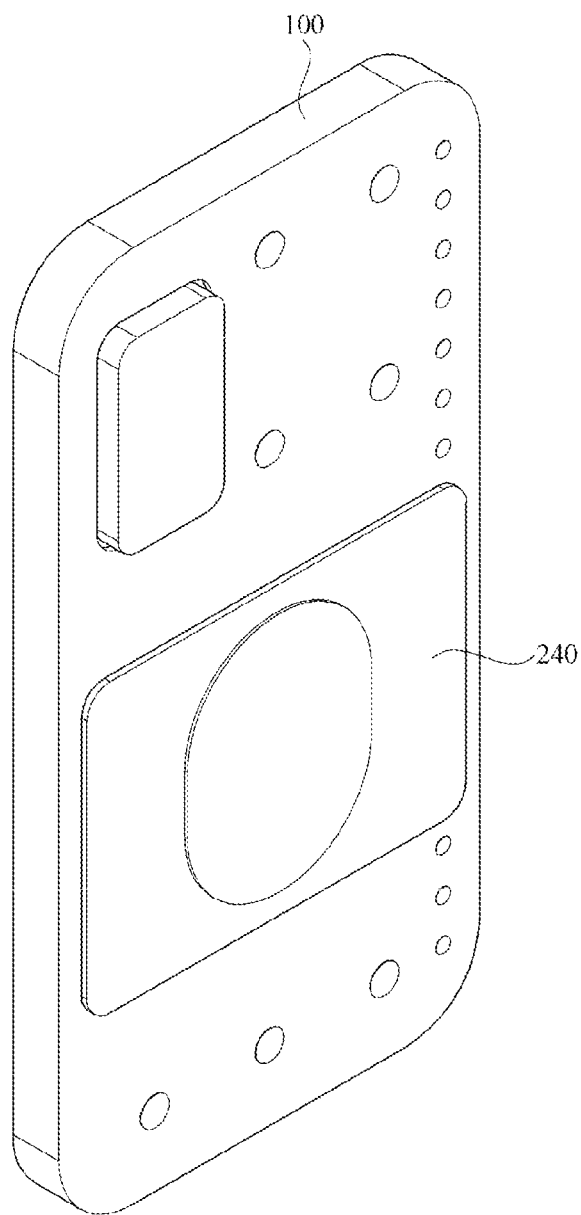
FIG. 14 is a schematic diagram of a handheld electronic device connected to the expansion module in FIG. 6 through a protective case according to the disclosure.
Figure 15:
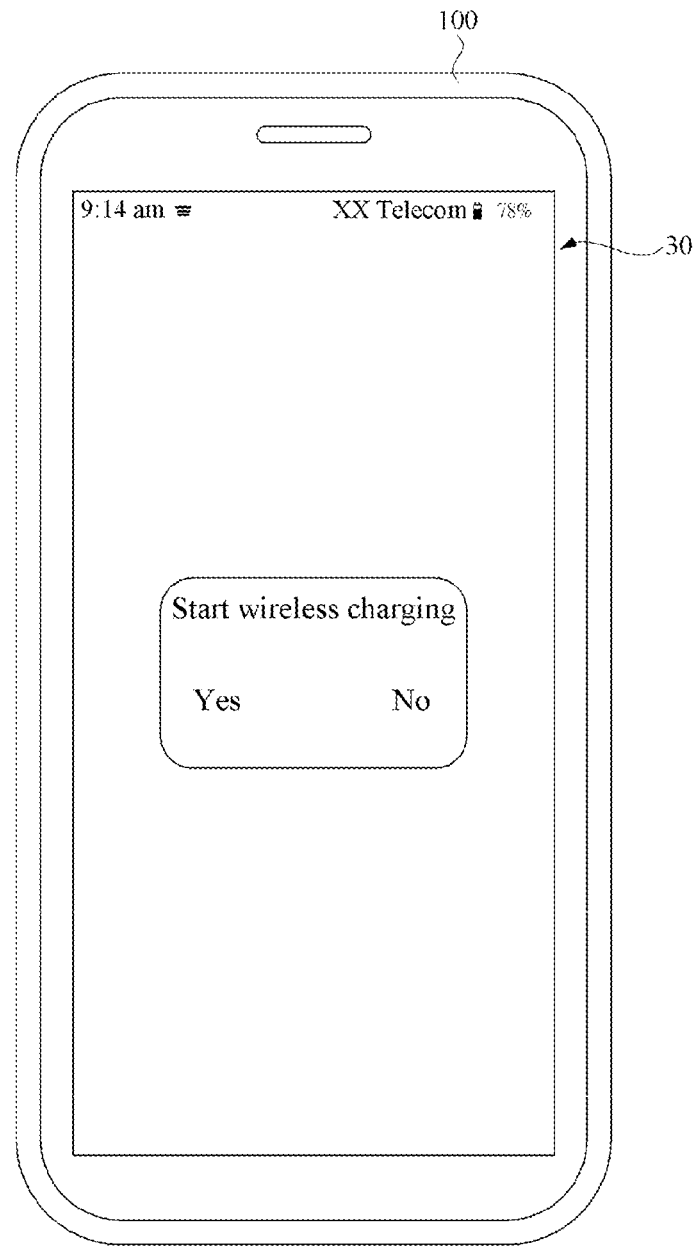
FIG. 15 shows a schematic front view of the handheld electronic device when connected to the expansion module in FIG. 6 according to the disclosure.

FIG. 14 is a schematic diagram of a handheld electronic device 30 connected to the expansion module 240 in FIG. 6 through a protective case 100 according to the disclosure. The figure shows the back of the protective case 100, and the handheld electronic device 30 is located in the inner space of the protective case 100 and is not shown. FIG. 15 shows a schematic front view of the handheld electronic device 30 when connected to the expansion module 240 in FIG. 6 according to the disclosure.

As shown in the figure, since the expansion module 240 is a wireless charging module, after executing the application program, the handheld electronic device 30 generates a dialog box to query whether to activate the wireless charging function of the wireless charging module to charge the battery of the handheld electronic device 30.

Figure 16:
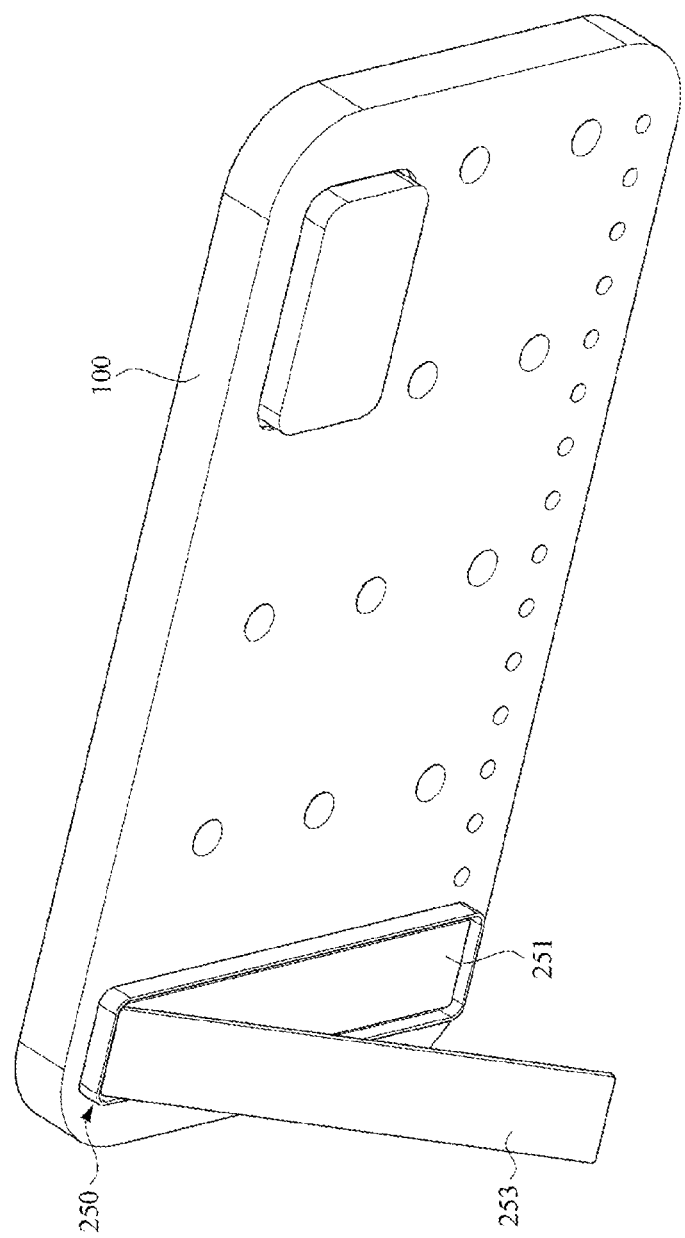
FIG. 16 is a schematic diagram of a handheld electronic device connected to the expansion module in FIG. 7 through a protective case according to the disclosure.
Figure 17:
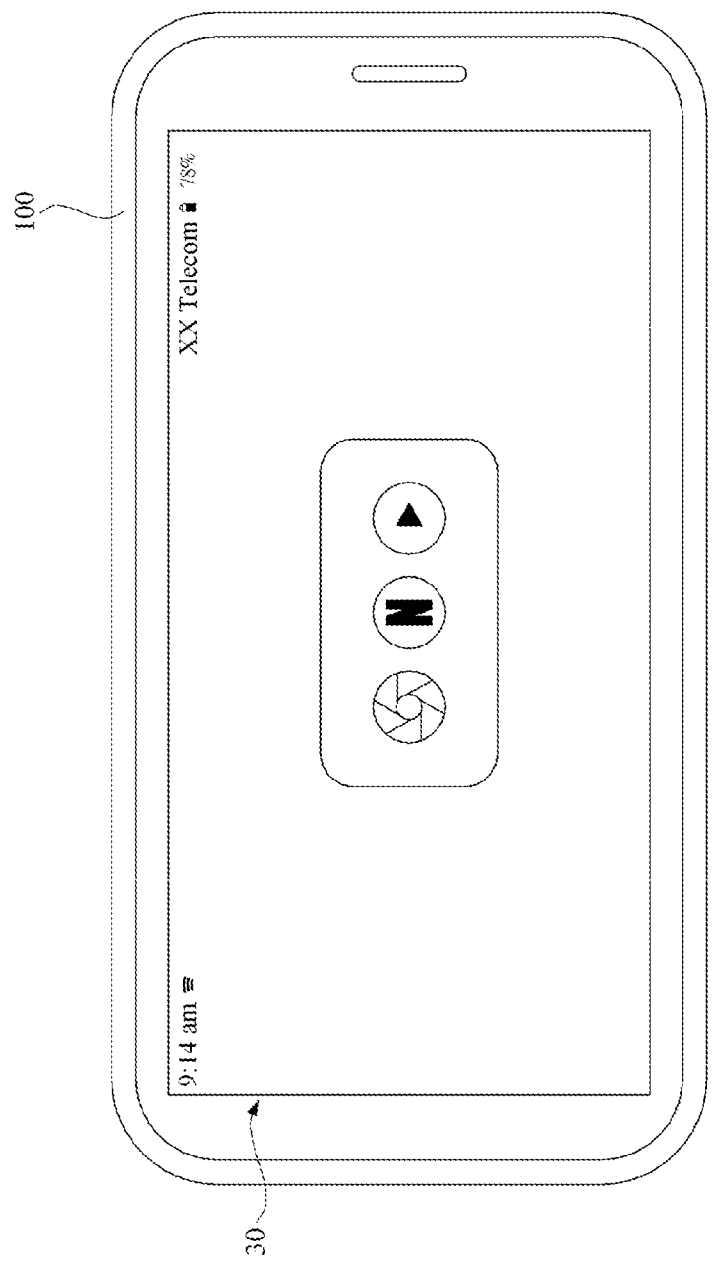
FIG. 17 shows a schematic front view of the handheld electronic device when connected to the expansion module in FIG. 7 according to the disclosure.

FIG. 16 is a schematic diagram of a handheld electronic device 30 connected to the expansion module 250 in FIG. 7 through a protective case 100 according to the disclosure. The figure shows the back of the protective case 100, and the handheld electronic device 30 is located in the inner space of the protective case 100 and is not shown. FIG. 17 shows a schematic front view of the handheld electronic device 30 when connected to the expansion module 250 in FIG. 7 according to the disclosure.

As shown in the figure, since the expansion module 250 is a bracket module, after executing the application program, the handheld electronic device 30 detects whether the movable part 253 of the bracket module is in the unfolded position. When the movable part 253 is in the unfolded position, the handheld electronic device 30 displays an icon of the application program related to audio and video on the display screen for the user to select.

The foregoing embodiments describe the usage situations of the protective case 100 connected to a single expansion module 210, 220, 230, 240, or 250. The protective case 100 in the disclosure is connected to a plurality of expansion modules at the same time for use.

Figure 18:
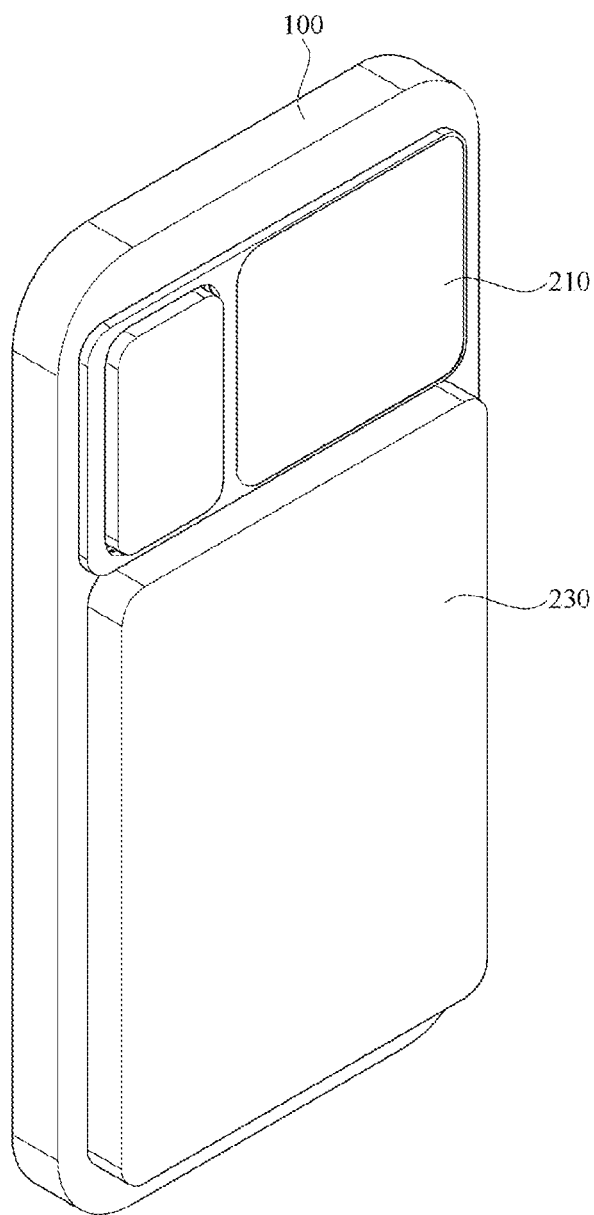
FIG. 18 is a schematic diagram of a handheld electronic device connected to the expansion modules in FIG. 3 and in FIG. 5 through a protective case according to the disclosure.
Figure 19:
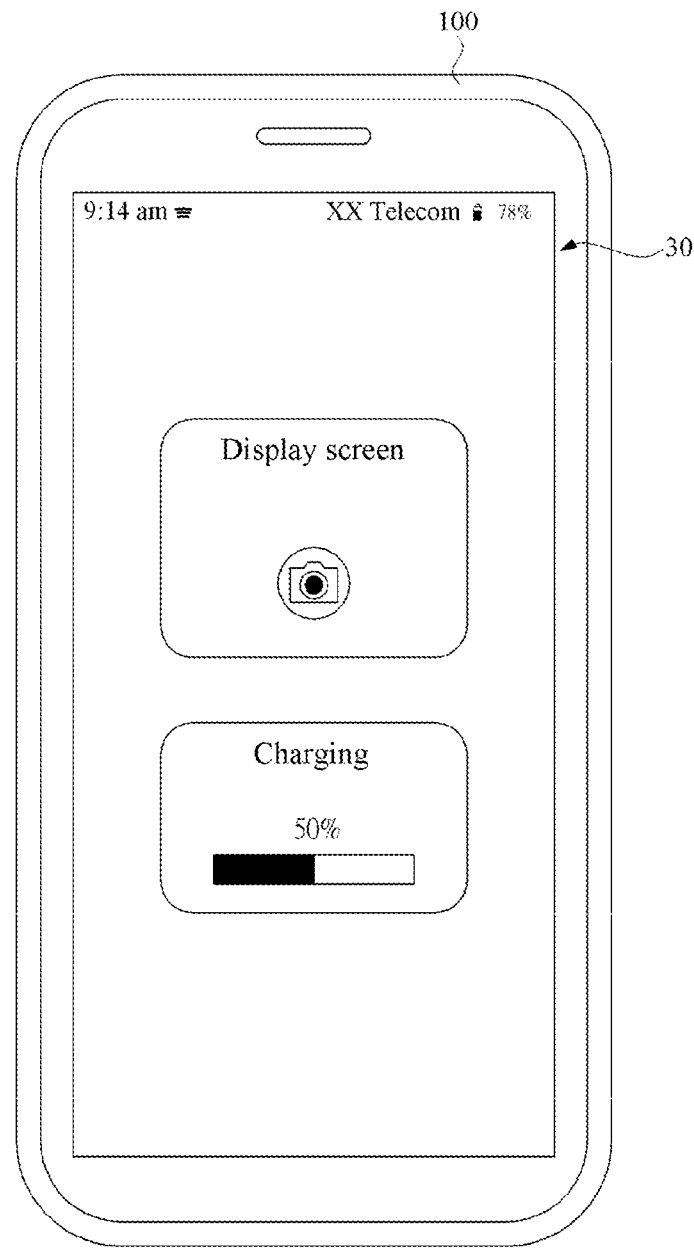
FIG. 19 shows a schematic front view of the handheld electronic device when connected to the expansion modules in FIG. 3 and FIG. 5 according to the disclosure.

FIG. 18 is a schematic diagram of a handheld electronic device 30 connected to the expansion module 210 and the expansion module 230 in FIG. 3 and FIG. 5 through a protective case 100 according to the disclosure. The figure shows the back of the protective case 100, and the handheld electronic device 30 is located in the inner space of the protective case 100 and is not shown. FIG. 19 shows a schematic front view of the handheld electronic device 30 when connected to the expansion module 210 and the expansion module 230 in FIG. 3 and FIG. 5 according to the disclosure.

As shown in the figure, the expansion module 210 is an expansion sub-screen, and the expansion module 230 is a battery module. The expansion module 210 and the expansion module 230 are fixed at different positions on the outer surface 120 of the protective case 100. The manner in which the expansion module 210 and the expansion module 230 are fixed on the protective case 100 and the manner in which the expansion module 210 and the expansion module 230 are electrically connected to the handheld electronic device are described above, and no repeated description is provided.

Since the expansion module 210 is an expansion sub-screen, and the expansion module 230 is a battery module, after executing the application program, the handheld electronic device 30 displays two vertically arranged windows on the display screen. The upper window displays a plurality of icons of the application program suitable for being displayed on the sub-screen for the user to select. The lower window displays the battery level of the battery module.

The window arrangement manner on the display screen in this embodiment is only one embodiment of the disclosure. Depending on actual situations, the two windows are also arranged horizontally when the handheld electronic device 30 is in a horizontal operation mode. The embodiments in FIG. 18 and FIG. 19 describe the case in which the handheld electronic device 30 is connected to the expansion module 210 and the expansion module 230 through the protective case 100 according to the disclosure. In other embodiments, when there is sufficient space on the protective case 100, or when the size of the expansion modules is small, more expansion modules are installed on the protective case for the user to use.

With the protective case provided in the disclosure, a user installs one or more expansion modules into the handheld electronic device according to needs. In this way, the user installs the required expansion module according to needs, so as to improve the flexibility in use. When the expansion function is not needed, the expansion module is removed to ensure the portability of the handheld electronic device.

The above descriptions are merely preferred embodiments of the disclosure, and are not intended to limit the disclosure in any form. Without departing from the scope of the technical means of the disclosure, any form of equivalent replacement or modification made to the technical means and technical content of the disclosure by a person skilled in the art belongs to the content not departing from the technical means of the disclosure and shall fall within the protection scope of the disclosure.

What is claimed is:

1. A protective case, applied to assemble to a handheld electronic device, comprising:
    an inner surface;
    an outer surface;
    a connector, disposed at the inner surface to electrically connect to the handheld electronic device, and comprising a plurality of signal transmitting pins;
    a plurality of first detachable connecting structures, arranged in a first array on the outer surface, the first array being arranged in both vertical and horizontal directions on a larger portion of the outer surface; and
    a plurality of first electrical connecting structures, arranged in a second array on the outer surface, and electrically connected to the signal transmitting pins respectively, the second array being arranged on a remaining side portion of the outer surface;
    wherein the first array has a first spacing distance, the second array has a second spacing distance, and the second spacing distance is smaller than the first spacing distance.

2. The protective case according to claim 1, further comprising an expansion module detachably connected to some of the first detachable connecting structures and some of the first electrical connecting structures.

3. The protective case according to claim 2, wherein the expansion module comprises a connecting surface, a plurality of second detachable connecting structures and a plurality of second electrical connecting structures, the second detachable connecting structures are arranged in a third array on the connecting surface, the second electrical connecting structures are arranged in a fourth array on the connecting surface, and the third array is different from the fourth array.

4. The protective case according to claim 3, wherein a third spacing distance between two adjacent second electrical connecting structures is the same as the first spacing distance between two adjacent first electrical connecting structures.

5. The protective case according to claim 3, wherein the number of the second detachable connecting structures is less than the number of the first detachable connecting structures, and the number of the second electrical connecting structures is less than the number of the first electrical connecting structures.

6. The protective case according to claim 1, wherein the first array is different from the second array.

7. The protective case according to claim 1, wherein the second array is a linear array.

8. The protective case according to claim 2, wherein the expansion module is a battery module, a wireless charging module, a screen module, a light emitting module, or a bracket module.

9. The protective case according to claim 2, wherein the number of the expansion modules is two.

* * * * *